United States Patent [19]

Funabashi

[11] Patent Number: 5,717,800
[45] Date of Patent: Feb. 10, 1998

[54] WAVEGUIDE-TYPE OPTICAL DEVICE COUPLING STRUCTURE WITH CIRCULAR RODS

[75] Inventor: Masaaki Funabashi, Tokyo, Japan

[73] Assignee: NEC Corporation, Tokyo, Japan

[21] Appl. No.: 623,424

[22] Filed: Mar. 28, 1996

[30] Foreign Application Priority Data

Mar. 31, 1995 [JP] Japan .................. 7-097609

[51] Int. Cl.$^6$ ................................ G02B 6/30
[52] U.S. Cl. ............... 385/49; 385/14; 385/31; 385/50; 385/60
[58] Field of Search ............... 385/49, 14, 31, 385/50, 60, 65, 66, 68, 70

[56] References Cited

U.S. PATENT DOCUMENTS 4,772,086  9/1988  Bellerby et al. .................. 385/49

FOREIGN PATENT DOCUMENTS

| 0 277 390 | 8/1988 | European Pat. Off. |
| 0 458 608 A1 | 11/1991 | European Pat. Off. |
| 1-227109 | 9/1989 | Japan. |

OTHER PUBLICATIONS

Patent Abstract of Japan, vol. 13, No. 547, JP–1227109 Nov. 9, 1989.

Patent Abstract of Japan, vol. 15, No. 242, JP–3075708.

*Primary Examiner*—Phan T. H. Palmer
*Attorney, Agent, or Firm*—Scully, Scott, Murphy & Presser

[57] ABSTRACT

A waveguide-type optical device is constituted by an optical waveguide circular rod inside which an optical waveguide device is fixed and supported, an optical fiber circular rod inside which the end of an optical fiber is fixed and supported and a circular sleeve from both ends of which these optical waveguide circular rod and optical fiber circular rod are fitted. An optical waveguide and an optical fiber can be readily aligned by forming the circular rod in a circle so that one optical waveguide in an optical waveguide device is located in the center and the circular rod in a circle so that one optical fiber is located in the center. Another optical waveguide and another optical fiber can be readily aligned by setting a position in the peripheral direction and fitting both the circular rods and to the circular sleeve. An optical fiber and an optical waveguide device can be readily connected.

15 Claims, 8 Drawing Sheets

WAVEGUIDE-TYPE OPTICAL DEVICE COUPLING STRUCTURE WITH CIRCULAR RODS

BACKGROUND OF THE INVENTION

1. Field of the Invention

The present invention relates to a waveguide-type optical device for optical communication and more particularly to structure for optically connecting an optical waveguide device and an optical fiber.

2. Description of Related Art

If an optical waveguide formed on a semiconductor or derivative substrate and an optical fiber are optically connected, the optical waveguide (core) formed on such a substrate are and the core of the optical fiber required to be connected with them opposite. Heretofore, a method by which an optical waveguide and an optical fiber are connected, aligning both cores is taken.

To connect and fix an optical fiber terminal wherein an optical fiber is housed and an optical waveguide substrate, first the core of the optical fiber and the core of the optical waveguide are required to be aligned and for that, they are respectively moved little by little using a manipulator and so on. At this time, light is injected through the optical fiber or the optical waveguide and the output is monitored. The optical fiber and the optical waveguide are adjusted in their optimum position based upon the intensity of monitored light varied depending upon both relative positional relationship. After the optimum position is detected, the optical fiber terminal and the optical waveguide substrate are fixed.

However, as an adhesive is normally used for fixing both, a fixed time is required until the adhesive is hardened. In some cases, an optimum positional relationship cannot be maintained due to subtle positional change of a manipulator for the while. Also, the strength of fixing by adhesion is low and deterioration due to aging may occur.

SUMMARY OF THE INVENTION

The object of the present invention is to provide a waveguide-type optical device wherein an optical fiber and an optical waveguide can be readily connected.

An optical waveguide module according to the present invention is provided with an optical waveguide circular rod inside which an optical waveguide device is fixed and supported and on the end face in the axial direction of which the connecting end of the optical waveguide is exposed. The optical waveguide module is also provided with an optical fiber circular rod inside which the end of an optical fiber is fixed and supported and on the end face in the axial direction of which the connecting end of the optical fiber is exposed. The optical waveguide module is further provided with a circular sleeve through both ends of which the optical waveguide circular rod and the optical fiber circular rod are fitted. The optical waveguide circular rod is formed in a circle with one of plural optical waveguides provided to the optical waveguide device as the center. The optical fiber circular rod is formed in a circle with one of arranged plural optical fibers as the center.

The optical waveguide circular rod and the optical fiber circular rod are provided with a shaft hole formed inside the respective columnar member or a groove formed or a groove formed on a part of the respective circumference. A base material for supporting the optical waveguide device and the end of the optical fiber is fixed into the shaft hole or on the groove.

The columnar member is divided in two in the direction of the diameter and a groove is provided on at least one face divided in two. The base material for the optical waveguide device and the optical fiber is fitted into this groove and the divided faces are respectively bonded. A cylindrical member is integrated outside the columnar member and the peripheral face of this cylindrical member is formed in a circle.

The circular rod is constituted by the columnar member provided with the base material for the optical waveguide device and the optical fiber inside. These optical waveguide and optical fiber can be readily aligned by forming the peripheral face of the circular rod in a circle with each one of the optical waveguide and the optical fiber as the center. As the position in the circumferential direction can be set by engaging the circular rod with the circular sleeve, the other optical waveguides and the optical fiber can be readily aligned.

In a waveguide-type optical device according to the present invention, a base material by which an optical waveguide device and an optical fiber are supported is fixed into a shaft hole or on a groove provided to a columnar member. A cylindrical member is fitted to the outside of this columnar member and integrated with the columnar member. The end face of the columnar member and the cylindrical member is polished together with the base material for the optical waveguide device and the optical fiber so as to flatten it. The peripheral face of the cylindrical member is machined so that it is formed in a circle with one of optical waveguides of the optical waveguide device or one of optical fibers as the center. By the above-described method the optical waveguide circular rod and the optical fiber circular rod can be manufactured.

BRIEF DESCRIPTION OF THE DRAWINGS

The above and other objects, features and advantages of the present invention will become more apparent from the following detailed description when taken in conjunction with the accompanying drawings wherein:

FIG. 8 (a–d) are cross section showing an example of another constitution of each circular rod.

DETAILED DESCRIPTION OF THE PREFERRED EMBODIMENTS

First, the conventional waveguide-type optical device will be described to facilitate understanding of the present invention before the constitution of a waveguide-type optical device according to the present invention is described.

Figure 1:
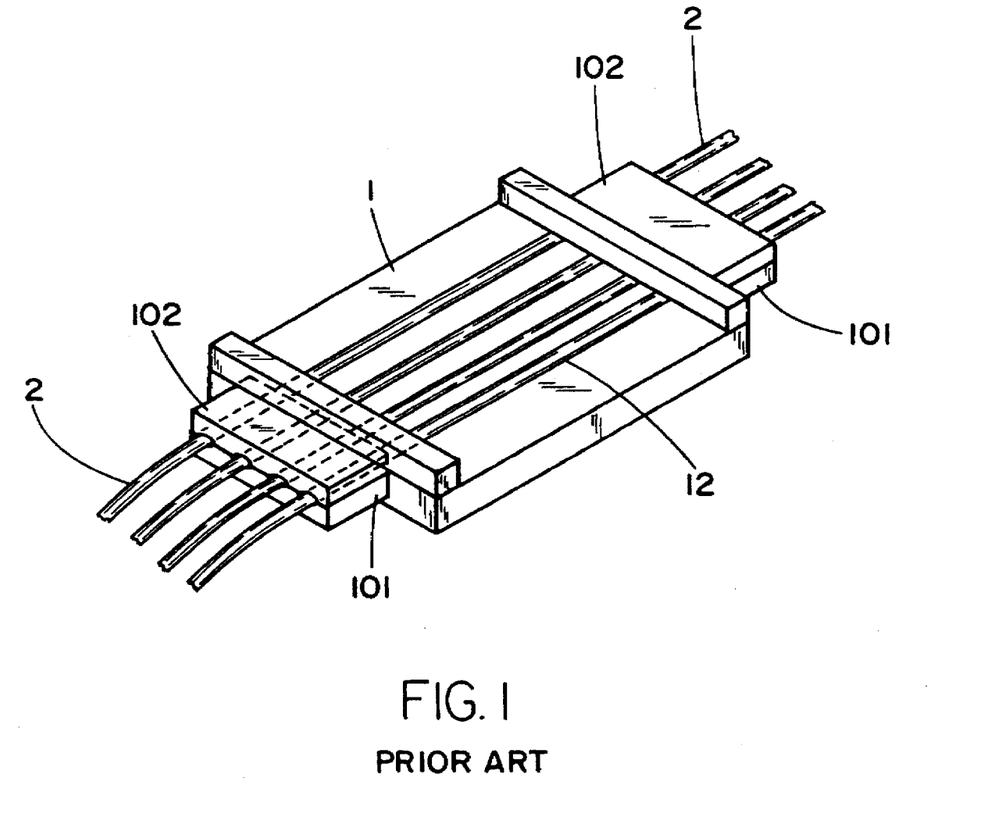
FIG. 1 is a perspective drawing showing an example of the conventional waveguide-type optical device.

FIG. 1 is a perspective drawing showing an example of the conventional waveguide-type optical device. The waveguide-type optical device shown in FIG. 1 is provided with an optical waveguide device 1 wherein four optical waveguides 12 respectively connected to four optical fibers 2 are formed. The optical fibers 2 are respectively arranged on a substrate 101 on which a V-shaped groove is formed. The optical fibers 2 are pressed by a cover plate 102 downward and fixed by an adhesive. Each end face of the substrate 101 and the cover plate 102 and the optical fiber 2 is polished integrally.

The position of the terminal of the optical fiber is adjusted so that the terminal is optically connected to the core of the optical waveguide 12 exposed on the end face of the substrate 101 of the optical waveguide device 1. The end faces of both are touched and stuck by an adhesive. A plurality of V-shaped grooves formed on the substrate 101 are formed so that pitch between adjacent grooves is equal to that between adjacent cores of the optical waveguides 12. By equalizing each pitch, all optical fibers 2 can be connected to each core of respective optical waveguides.

Figure 2:
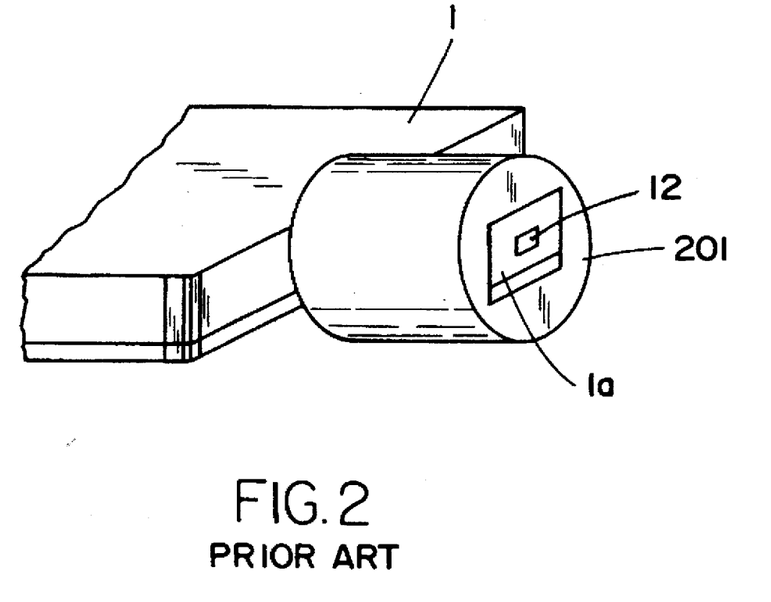
FIG. 2 is a perspective drawing showing the other example of the conventional waveguide-type optical device.

FIG. 2 shows the constitution according to another prior art described in Japanese Patent Application Laid-open No. Hei-227109. The end portion 1a of the device including the core of the optical waveguide 12 formed by working a part of the optical waveguide device 1 in which the core of the optical waveguide 12 exists is protruded. The periphery of the end portion is integrally covered with a metallic pipe 201. The periphery of the metallic pipe 201 is machined with the core 12 as the center. An optical fiber terminal not shown manufactured by the same method and the metallic pipe 201 are optically connected via a sleeve not shown.

However, in the constitution shown in FIG. 1, when the core of the optical fiber and the core of the optical waveguide device are aligned to connect the optical fiber terminal and the optical waveguide device, the respective positions are moved little by little using a manipulator and so on. At this time, the optimum position is searched, checking whether the state is an optically connected state or not and in the optimum position the optical fiber terminal and the optical waveguide device are fixed by an adhesive. If a plurality of optical fibers shown in a drawing are connected, an aligning seat for a plurality of optical fibers is required. Even if the optimum position is found and the optical fiber terminal and the optical waveguide device are stuck in the optimum position, they are required to be held in the optimum position for at least one or two minutes until an adhesive is hardened. In some cases, a manipulator is minutely moved due to temperature, vibration or the gravity and in such a case, it is impossible to hold the optical fiber terminal and the optical waveguide device in the optimum position.

According to the art shown in FIG. 2, only a part of the optical waveguide device is covered with a metallic pipe. Therefore, when the periphery is machined, the optical waveguide device must be held. As the substrate wherein an optical waveguide is formed is normally formed by fragile material, the substrate cannot bear stress when the periphery is machined and may be broken. It is also impossible to work the optical waveguide device so as to form an area including the core so that it is protruded. Further, this constitution is effective if one optical fiber is connected to one core, however, this constitution cannot be applied if a plurality of cores and an optical fiber are simultaneously connected.

Next, an embodiment of an waveguide-type optical device according to the present invention will be described in detail referring to the drawings.

Figure 3:
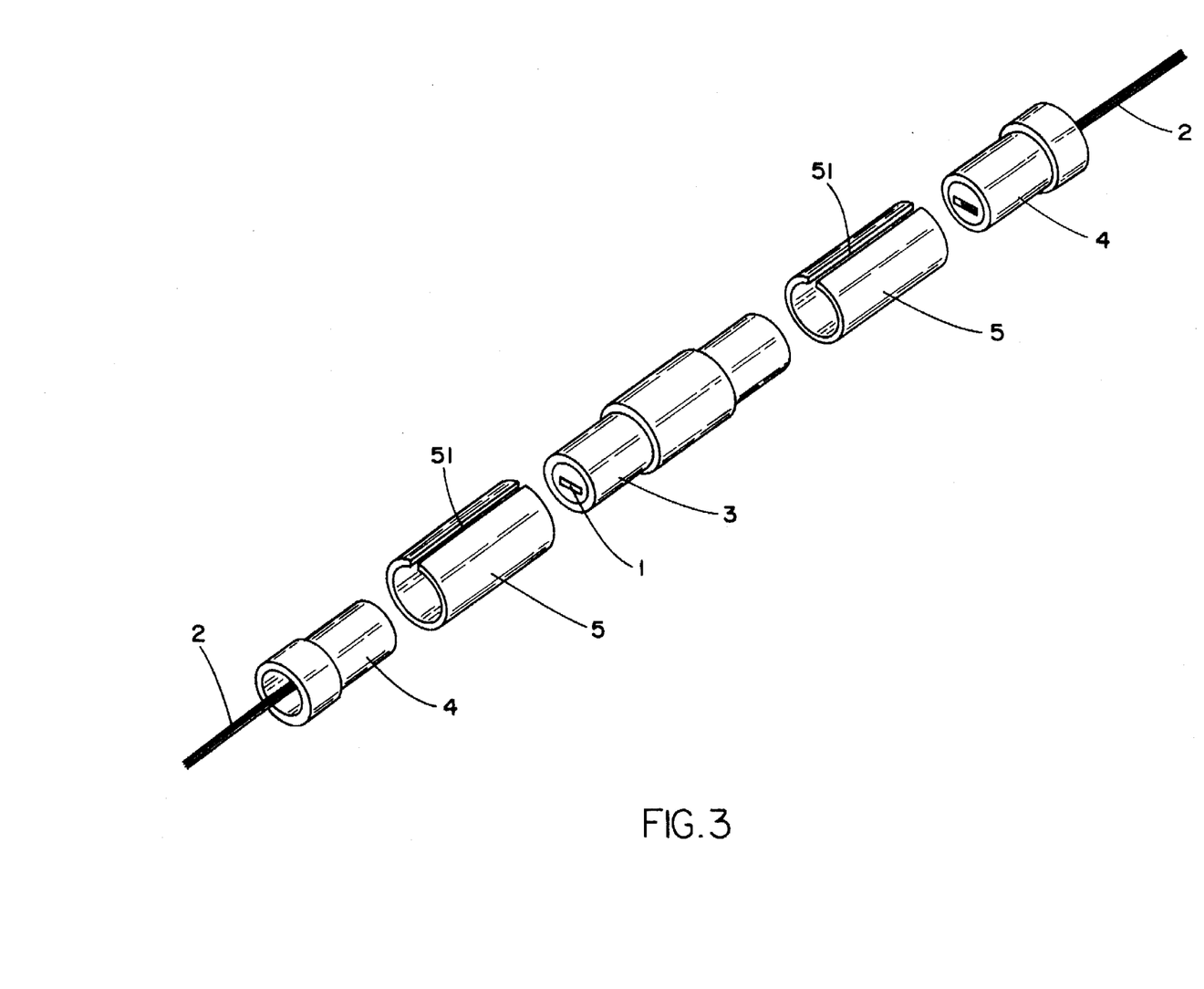
FIG. 3 is a perspective exploded view showing an embodiment of a waveguide-type optical device according to the present invention.

FIG. 3 is a perspective exploded view showing an embodiment of a waveguide-type optical device according to the present invention. In this case, a substrate made of quartz is used for an optical waveguide device 1 and a quartz waveguide which is formed by silicon dioxide is shown as an example. The optical waveguide is provided with a light branching function.

Figure 4:
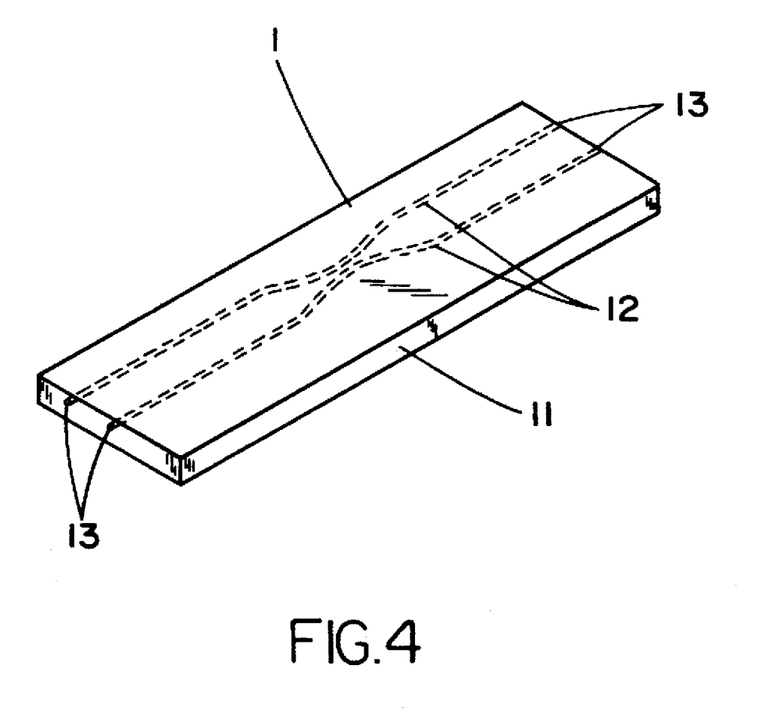
FIG. 4 is a perspective drawing showing an example of an optical waveguide device used for a waveguide-type optical device according to the present invention.

Two optical fibers 2 are respectively connected to both ends of a light branching filter. The light branching filter 1 branches light using a pair of waveguides 12 formed in a semiconductor substrate 11 as shown in FIG. 4. The optical waveguide is formed in a long and thin rectangular substrate.

The end of the optical waveguide is respectively exposed on both faces in the horizontal direction and two optical waveguide ports 13 are formed. The end faces of two optical fibers 2 shown in FIG. 3 are respectively connected concentrically to these optical waveguide ports 13.

In FIG. 3, the waveguide-type optical device is provided with an optical waveguide circular rod 3 wherein a pair of optical waveguide devices 1 are housed, two optical fiber circuit rods 4 for integrally supporting respective ends of optical fibers 2 and a circular sleeve 5 for concentrically connecting the optical waveguide circular rod 3 and the optical fiber circular rods 4.

Figure 5:
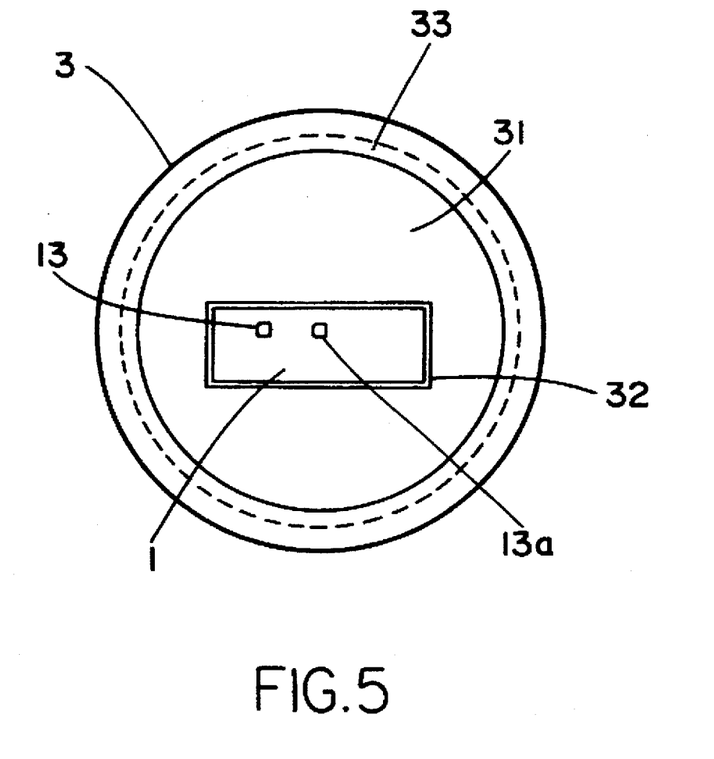
FIG. 5 shows the end face of an optical waveguide circular rod used for a waveguide-type optical device according to the present invention.

FIG. 5 shows the end face of an optical waveguide circular rod used for a waveguide-type optical device according to the present invention. A slot 32 is provided in the axial direction in the center of a columnar member 31 to the optical waveguide circular rod 3. The optical waveguide device 1 is inserted into the slot 32 and is integrally stuck and fixed on the inner face of the slot 32 by an adhesive and so on. A cylindrical member 33 is fitted around the columnar member 31 and integrated with the peripheral face of the columnar member 31 by an adhesive. The columnar member 31 and the cylindrical member 33 are formed by metal such as stainless steel and a ceramic. The end face of the optical waveguide device 1 at the optical waveguide port 13 is flattened by polishing both ends of the columnar member 31 and the cylindrical member 33 flatly.

Further, as shown by a broken line in FIG. 5, the peripheral faces of stuck cylindrical member 33 at both ends are machined so that the peripheral face is a circle with a predetermined radius. The surface of the cylindrical member 33 is machined so that the peripheral face is a circle with one 13a of two optical waveguide ports 13 exposed on the end face of the optical waveguide device 1 as the center.

Figure 6:
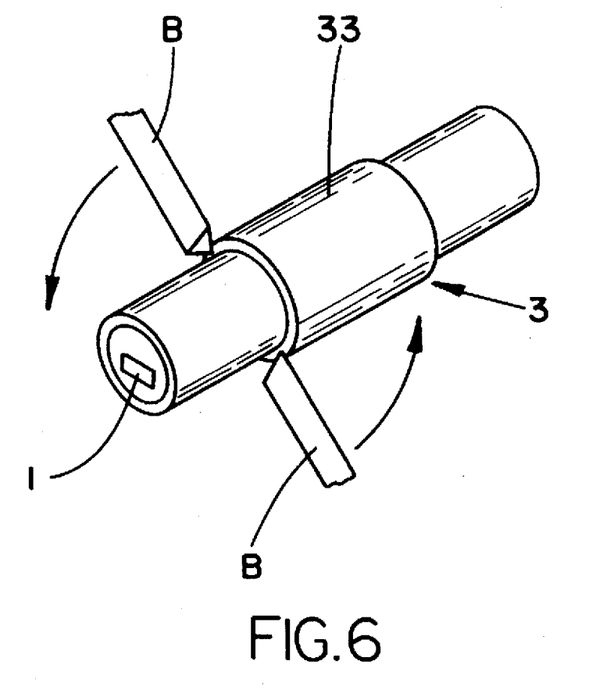
FIG. 6 is a conceptual drawing to explain a method of machining the circular rod shown in FIG. 5.

Such machining is performed by fixing and supporting the optical waveguide circular rod 3 and cutting the peripheral face of the cylindrical member 33, rotating a cutting tool B around the optical waveguide circular rod, for example as shown in FIG. 6. The optical waveguide circular rod 3 can be cut up to a predetermined radius by gradually reducing the radius of rotation of the cutting tool B. If at this time, white light is incident through the optical waveguide port 13a located in the center of the optical waveguide device 1, the axial position of this optical waveguide port 13a can be checked by light. By this, alignment with the cutting tool B can be readily performed. Each periphery at both ends of the optical waveguide circular rod 3 is machined in a circle with the same optical waveguide port as the center. It need hardly be said that by this, circles at both ends are concentric.

Figure 7:
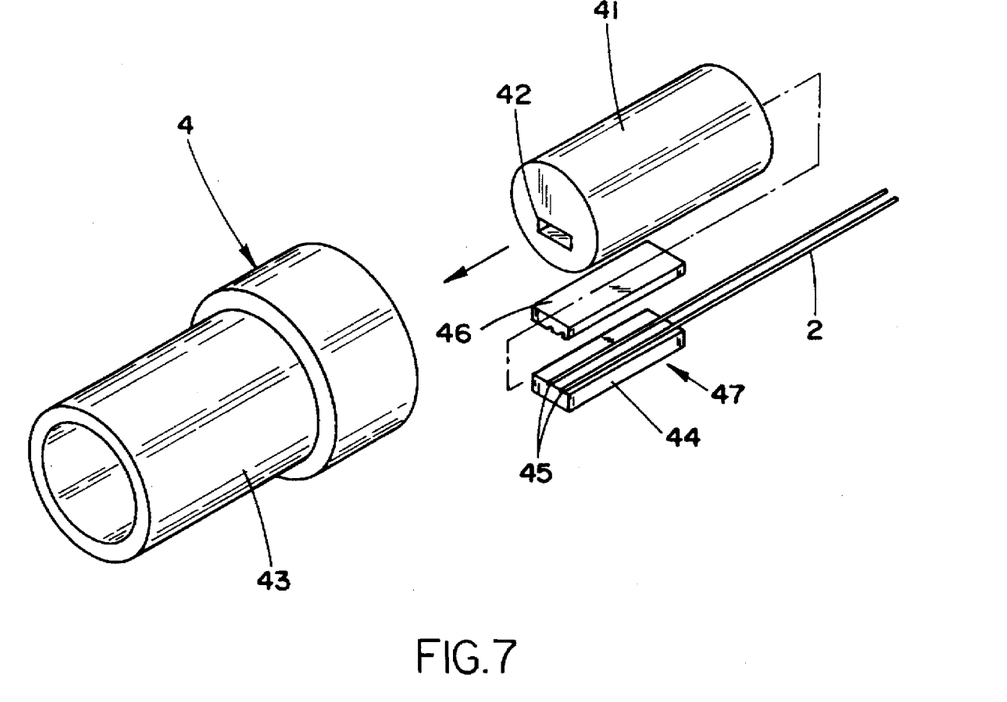
FIG. 7 is a perspective exploded view showing the optical fiber circular rod shown in FIG. 5.

FIG. 7 is a perspective exploded view showing the optical fiber circular rod shown in FIG. 5. As shown in FIG. 7, the ends of two optical fibers 2 are arranged on a substrate 44 on the surface of which a V-shaped groove 45 is formed at the same space as that between two optical waveguide ports 13 of an optical waveguide device. Each end of two optical fibers is fitted into each V-shaped groove 45 and an optical fiber circular rod 4 is formed. Further, a cover plate 46 is covered on the substrate and fixed on the surface of the substrate 44 by an adhesive. The optical fiber 2 is held between the substrate 44 and the cover plate 46 and a base material 47 is formed.

A rectangular slot 42 is provided in the center of a columnar member 41. The integrated base material 47 is inserted into the slot 42, is stuck and fixed by an adhesive.

The end of the optical fiber 2 is fixed and supported by the columnar member 41. In addition, as the case of the optical waveguide circular rod 3, a cylindrical member 43 is covered outside the columnar member 41 and fixed by an adhesive. The end faces of these columnar member 41 and the cylindrical member 43 are polished so that they are flat and the peripheral face of the cylindrical member 43 is cut so that it is a circle with a predetermined diameter with one end of the optical fiber 2 as the center.

Therefore, the end faces at both ends of the optical waveguide circular rod 3 constituted as described above are flattened. In addition, the peripheral face is formed in a circle with a specific optical waveguide port 13a as the center. The end faces at both ends of the optical fiber circular rod 4 are also flattened and the peripheral face is formed in a circle with one end of the optical fiber 2 as the center.

As shown in FIG. 3, the bore diameter of the peripheral face of each circular rod 3 and 4 is a little smaller than the outer diameter and one end of the optical waveguide circular rod 3 is fitted to one end of a circular sleeve 5 at a part of the periphery of which a slit 51 in the axial direction is formed. The other end of the circular sleeve is fitted to the end of the optical fiber circular rod 4. By fitting both, the specific optical waveguide port 13a located in the center and one end of the optical fiber are aligned. Space between the optical waveguide ports 13 and 13a can be manufactured with a precision of 0.5 □m or less. Therefore, by only rotating either of circular rods 3 and 4 in the direction in which the axis is rotated, the other optical waveguide port and the other optical fiber can be aligned. If in this state, each circular rod 3 and 4 is stuck and fixed on the inner face of the circular sleeve 5, the optical fiber 2 and the optical waveguide port 13 can be optically connected precisely.

By this, the optical fiber and the optical waveguide device can be readily aligned by only rotating them. At this time, as a little elasticity is provided to the circular sleeve 5 in the direction of the diameter by the slit 51, the circular sleeve holds each circular rod 3 and 4 by elasticity.

When each circular rod 3 and 4 is stuck and fixed to the circular sleeve 5, the optimum position can be readily held. As the optical waveguide device is not worked, no problem such as breakage occurs.

In this embodiment, in the case of circular rods 3 and 4, the cylindrical member is fitted on the columnar member.

This constitution is effective to facilitate machining and working circular material by constituting the cylindrical member by material which can be relatively readily worked. Therefore, if the columnar member is constituted by material which can be readily worked, the cylindrical member may be omitted.

Figure 8A:
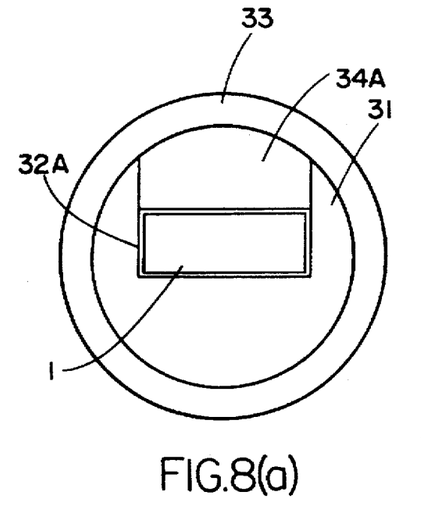
Figure 8B:
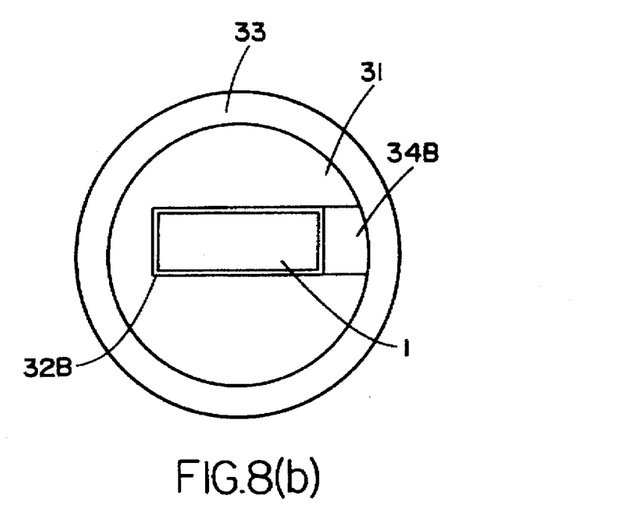

In this embodiment, an example that the base material for the optical waveguide device and the optical fiber is inserted into a hole provided to the columnar member, stuck and fixed is shown. However, in FIGS. 8(a) and (b) shown in an optical waveguide circular rod, rectangular grooves 32A and 32B extending in the axial direction are formed at a part of the periphery of the columnar member 31. The optical waveguide device may be stuck and fixed to the columnar member 31 by housing the optical waveguide device 1 in such a groove. In this case, the optical waveguide device 1 and a pressing member 34A or 34B may be integrally stuck into the groove 32A or 32B respectively. In this example, the optical waveguide device 1 is put on the bottom of the rectangular groove 32A in FIG. 8(a) and it is put on the side wall of the rectangular groove 32B in FIG. 8(b).

Figure 8C:
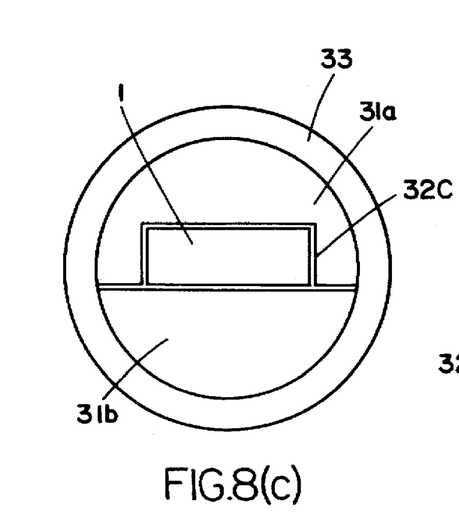
Figure 8D:
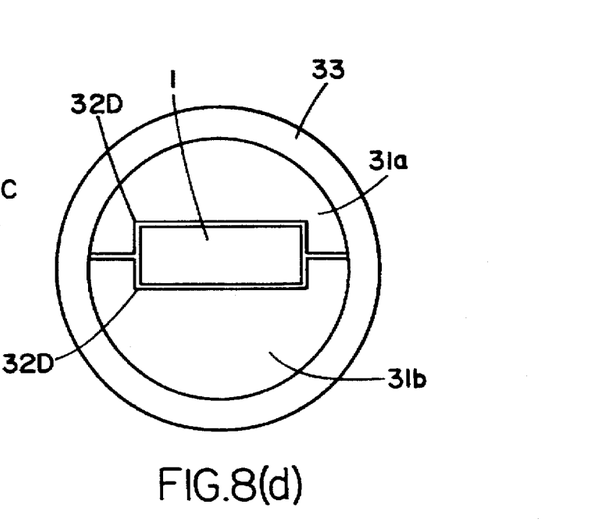

Or as shown in FIGS. 8(c) and (d), the columnar member 31 is put approximately in the center, is divided in two in the direction of the diameter and the optical waveguide device 1 may be held between these. In FIG. 8(c), a rectangular groove 32 C is provided in one 31a of divided columnar members 31a and 31b, the optical waveguide device 1 is housed in this groove 32C and the other divided columnar member 31b is stuck on the optical waveguide device. In FIG. 8(d), a shallow rectangular groove 32D is respectively formed in divided both columnar members 31a and 31b, the optical waveguide device 1 is housed in these and both are stuck.

A base material for an optical fiber is also similar if it is housed in a columnar member. As described above, if constitution in which a groove is provided in a columnar member and a base material for an optical waveguide device and an optical fiber is fixed is adopted, such a state is not preferable to enhance the precision of working because a part of an adhesive is exposed on the periphery when the periphery of a columnar member is machined or worked in a circle. In this case, as shown in the above-described embodiment, by fitting a cylindrical member on a columnar member and machining or working the periphery of this columnar member, the precision can be enhanced.

In the above-described embodiment, a branching filter is used for an optical waveguide device, however, it need hardly be said that the present invention can be applied to the other optical waveguide device. If one or three or more optical waveguides and optical fibers are connected, the present invention can be also applied.

As described above, a waveguide-type optical device according to the present invention is constituted by an optical waveguide circuit rod inside which an optical waveguide device is fixed and supported, an optical fiber circular rod inside which the end of an optical fiber is fixed and supported and a circular sleeve to which these circular rods are fitted. As each circular rod is formed in a circle respectively with one of plural optical waveguides provided in an optical waveguide device as the center or with one of plural optical fibers as the center, alignment by a manipulator is not required when the optical waveguide device and an optical fiber are optically connected. Therefore, the operation can be readily performed and a plurality of optical waveguides and optical fibers can be concurrently aligned and connected.

According to the present invention, a columnar member inside which a base material for an optical waveguide device and an optical fiber is housed or a cylindrical member provided outside the columnar member is formed in a circle by machining the respective periphery. Therefore, an optical waveguide device formed by fragile material is not required to be worked. Therefore, it can be prevented from being broken by protecting it from stress in machining the periphery. Particularly, a circle can be readily machined independent of material of a columnar member by using a cylindrical member.

While this invention has been described in connection with certain preferred embodiments, it is to be understood that the subject matter encompassed byway of this invention is not to be limited to those specific embodiments. On the contrary, it is intended for the subject matter of the invention to include all alternative, modification and equivalents as can be included within the spirit and scope of the following claims.

What is claimed is:

1. A waveguide-type optical device, comprising
   an optical waveguide device in which an optical waveguide is formed;
   an optical fiber;
   an optical waveguide circular rod inside which said optical waveguide device is fixed and on the end face of which the end of said optical waveguide is exposed;
   an optical fiber circular rod inside which the end of said optical fiber is fixed and supported and on the end face of which the end of said optical fiber is exposed; and
   a circular sleeve from both ends of which said optical waveguide circular rod and optical fiber circular rod are respectively fitted;
   wherein at a part of the periphery of said circular sleeve, a slit is formed; and
   the normal bore diameter of said circular sleeve is smaller than the outer diameter of said optical waveguide circular rod or optical fiber circular rod.

2. A waveguide-type optical device according to claim 1, wherein:
   said optical waveguide circular rod and said optical fiber circular rod are respectively provided with a hole formed inside a columnar member;
   a base material for supporting said optical waveguide device and the end of said optical fiber is housed and fixed in said hole; and
   a cylindrical member is integrally fitted outside said columnar member.

3. A waveguide-type optical device according to claim 2, wherein:
   said columnar member is divided in two in the direction of the diameter;
   a groove is provided on at least one divided face; and
   a base material for said optical waveguide device and optical fiber is fitted inside said groove.

4. A waveguide-type optical device according to claim 3, wherein:
   at a part of the periphery of said circular sleeve, a slit is formed; and
   the normal bore diameter of said optical waveguide smaller than the outer diameter of said optical waveguide circular rod or optical fiber circular rod.

5. A waveguide-type optical device according to claim 1, wherein:
   said optical waveguide device includes a plurality of said optical waveguides;
   said optical waveguide circular rod is circular;
   one of said plural optical waveguides is located in the center; and
   said optical fiber circular rod with one of plural arranged optical fibers as the center is formed in a circle.

6. A waveguide-type optical device according to claim 5, wherein:
   said optical waveguide circular rod and said optical fiber circular rod respectively include a hole formed inside a columnar member;
   a base material for supporting said optical waveguide device and the end of optical fiber is housed and fixed inside said hole; and
   a cylindrical member is integrally fitted outside a columnar member.

7. A waveguide-type optical device according to claim 6, wherein:
   said columnar member is divided in two in the direction of the diameter;
   a groove is provided on at least one divided face; and
   a base material for said optical waveguide device and said optical fiber is fitted inside said groove.

8. A waveguide-type optical device according to claim 5, wherein:
   said optical waveguide circular rod and said optical fiber circular rod respectively include a groove formed inside a columnar member;
   a base material for supporting said optical waveguide device and the end of said optical fiber is housed and fixed inside said groove; and
   a cylindrical member is integrally fitted outside a columnar member.

9. A waveguide-type optical device according to claim 8, wherein:
   said columnar member is divided in two in the direction of the diameter;
   a groove is provided on at least one divided face; and
   a base material for said optical waveguide device and said optical fiber is fitted inside said groove.

10. A waveguide-type optical device according to claim 5, wherein:
    said optical fiber circular rod is provided with:
      a groove for arranging said optical fibers respectively;
      a first optical fiber housing means for fixing said optical fibers from the upper part; and
      a second optical fiber housing means for fixing said optical fibers from the lower part.

11. A waveguide-type optical device according to claim 10, wherein:
    said connecting means is provided with an arranged direction matching means for matching the direction in which said optical waveguide and said optical fiber are arranged.

12. A waveguide-type optical device according to claim 5, wherein:
    said optical waveguide circular rod is in the shape of a half moon;
    said optical waveguide circular rod is provided with:
      a first optical waveguide housing means for fixing a substrate in which said optical waveguide is formed from the upper part; and
      a second optical waveguide housing means for fixing a substrate in which said optical waveguide is formed from the lower part.

13. A waveguide-type optical device according to claim 5, wherein:
    said optical waveguide circular rod is cylindrical;
    said optical waveguide circular rod is provided with:
      a third optical waveguide housing means provided with a groove for housing a substrate in which said optical waveguide is formed; and
      a fourth optical waveguide housing means for pressing said substrate housed in said groove.

14. A waveguide-type optical device according to claim 1, wherein:

said optical waveguide circular rod and said optical fiber circular rod respectively include a groove formed inside a columnar member;

a base material for supporting said optical waveguide device and the end of said optical fiber is housed and fixed inside said groove; and a cylindrical member is integrally fitted outside a columnar member.

15. A waveguide-type optical device according to claim 14, wherein:

said columnar member is divided in two in the direction of the diameter;

a groove is provided on at least one divided face; and a base material for said optical waveguide device and optical fiber is fitted inside said groove.

* * * * *